3,264,321
N-ALKYL AND N-ALKANOYL DERIVATIVES
David R. Herbst, King of Prussia, Pa., assignor to American Home Products Corporation, New York, N.Y., a corporation of Delaware
No Drawing. Filed Nov. 1, 1963, Ser. No. 320,855
5 Claims. (Cl. 260—326.12)

This invention relates to derivatives of 1-benzenesulfonyl-2-methylindole. More particularly this invention relates to substituted derivatives of 3-acetyl-5-benzenesulfonamido-1-benzenesulfonyl-2-methylindole and to the method by which such compounds are prepared.

The new compounds of the present invention, characterized in their broadest aspect, are those encompassed within the following structural formula:

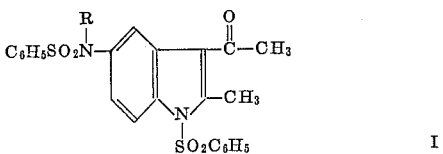

I wherein R is a member of the group consisting of lower alkyl, lower alkenyl and lower alkanoyl. It is preferred that the alkyl group above identified, represent such hydrocarbon radicals as methyl, ethyl, propyl, isopropyl, butyl and isobutyl. Carbon chains of similar length are preferred for the other members of the group represented by R above, namely the alkenyl and lower alkanoyl radicals.

The compounds of the present invention are prepared according to a preferred method by alkylating 3-acetyl-5-benzenesulfonamido-1-benzenesulfonyl-2-methylindole (II). This compound (II) may be prepared according to the method of R. Adams et al., J. Am. Chem. Soc., 80, 3293 (1958) or by the method of R. R. Holmes et al., J. Org. Chem., 26, 443 (1961). In carrying out the preparation of the compounds encompassed within those defined by Formula I above, a solution of II in dimethylformamide, or an equivalent solvent, is treated successively with an alkaline metal alkoxide such as sodium methoxide followed by treatment with a lower alkyl halide such as for example ethyl iodide. Other suitable alkylating or acylating agents would include the alkenyl and acyl halides and acid anhydrides of lower molecular weight, preferably within the range defined above with respect to the description of Formula I.

The reaction mixture containing II and the selected alkylating agent are heated for a period of from about ¼ hour to about 2 hours and preferably from about ⅓ hour to 1 hour. Heating is carried out at a temperature in the range of from about 65 to about 85° C. After heating has been carried out under the conditions specified, the reaction mixture is diluted with water and the product extracted with benzene or an equivalent solvent. The solids isolated from the benzene extracts are then crystallized from a selected hydroxylic solvent such as a low molecular weight alcohol or a solvent of similar type.

The new compounds of the present invention are of value for their pharmaceutical properties. They are useful as hypoglycemic agents and as anti-inflammatory agents.

When used for the purposes described, the new compounds of the present invention are preferably formed into a pharmaceutical preparation. The latter contains the specified compounds in admixture with a pharmaceutically administrable organic or inorganic carrier, such that the composition is suitable for enteral or parenteral administration. The composition may be prepared in solid form, such as in pills or tablets, or in liquid form such as as a solution, suspension or emulsion. Suitable liquid carriers include water, gelatin, lactose, starch, talc, vegetable oils, alcohols including polyalcohols, gums, U.S.P. syrups and the like. The pharmaceutical composition in addition to the active principle and the carrier may also include auxiliary materials such as coloring, stabilizing, wetting or emulsifying agents. It is of course recognized as essential that the carrier as well as any other materials present in combination with the active principle be inert with respect thereto.

Reference to the specific examples which follow will provide a better understanding of the new compounds of the present invention and the method by which they are prepared.

*Example I*

A solution of 20.00 g. of 3-acetyl-5-benzenesulfonamido-1-benzenesulfonyl-2-methylindole in 200 ml. dimethyl formamide is treated with 2.38 g. sodium methoxide, stirred 2 minutes, and 48.0 g. (25 ml.) ethyl iodide added. The reaction solution is stirred at 80–85° C. for ⅓ hour, cooled, poured into 1½ l. distilled water and the aqueous system is extracted with benzene. Washing of the benzene solution with water, drying ($Na_2SO_4$), removal of solvent and crystallization (twice) of the residue from methanol yields 13.41 g. (63%) of 3-acetyl-5-(N-ethylbenzenesulfonamido)-2-methyl-1-phenylsulfonylindole, M.P. 133–135° C.;

$$\lambda_{max.}^{KBr} \; 6.02, 7.45, 8.61\mu$$

*Example II*

Following the method of Example I, 3-acetyl-5-(N-acetyl-benzenesulfonamido)-2-methyl-1-phenylsulfonylindole is prepared by reacting compound II with acetic anhydride. The products melts at 169–171° C.

*Example III*

To prepare 3-acetyl-5-(N-allylbenzenesulfonamido)-2-methyl-1-phenylsulfonylindole, II is reacted with allyl bromide under the conditions specified in Example I. The M.P. of this compound is 130–132° C.

*Example IV*

To prepare 3-acetyl-5-(N-butyrylbenzenesulfonamido)-methyl-1-phenylsulfonylindole, II is reacted with butyryl chloride according to the method of Example I.

*Example V*

3-acetyl-5-(N-propionylbenzenesulfonamido)-2-methyl-1-phenylsulfonylindole is prepared by reacting II with propionyl chloride according to the method of Example I.

*Example VI*

Heating 3-acetyl-5-benzenesulfonamido-1-benzenesulfonyl-2-methylindole (30.00 g.), 250 ml. dimethyl formamide, 3.59 g. sodium methoxide and 41.7 g. (24.5 ml.) isopropyl iodide and processing the reaction solution according to previous examples gives a gum which, after trituration with n-hexane and crystallization (thrice) from methanol affords 14.68 g. (45%) of 3-acetyl-5-(N-isopropylbenzenesulfonamido)-2-methyl-1-phenylsulfonylindole, M.P. 157–159° C.;

$$\lambda_{max.}^{KBr} \; 5.95, 7.49, 8.60\mu$$

While the foregoing invention has been described with some degree of particularity in the specific examples, it is to be understood that the invention is not to be limited thereby but is only to be limited by the claims appended hereto.

The invention claimed is:
1. A compound of the formula:

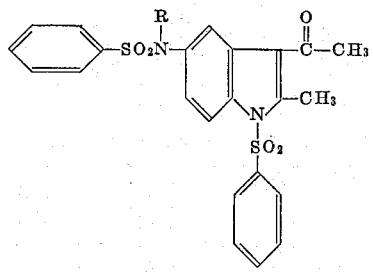

wherein R is a member of the group consisting of lower alkenyl and lower alkanoyl.

2. 3 - acetyl - 5 - (N - acetyl - benzenesulfonamido)-2-methyl-1-phenylsulfonylindole.

3. 3 - acetyl - 5 - (N - allylbenzenesulfonamido)-2-methyl-1-phenylsulfonylindole.

4. 3 - acetyl - 5 - (N - butyrylbenzenesulfonamido)-2-methyl-1-phenylsulfonylindole.

5. 3 - acetyl - 5 - (N - propionylbenzenesulfonamido)-2-methyl-1-phenylsulfonylindole.

References Cited by the Examiner
UNITED STATES PATENTS

| | | | |
|---|---|---|---|
| 2,694,720 | 4/1954 | Denton et al. | 260—556 |
| 3,121,089 | 2/1964 | Jonsson | 167—65 |
| 3,155,721 | 11/1964 | Mills et al. | 167—65 |

OTHER REFERENCES

Burger: Medicinal Chemistry, 2d ed., Interscience Publishers, Inc., New York, 1960, p. 808.

Holmes et al.: Jour. Org. Chem., vol. 26, 1961, pp. 439–443.

Migrdichian: Organic Synthesis, vol. 2, Reinhold Publishing Corp., New York, 1957, pp. 1694–1695.

HENRY R. JILES, *Acting Primary Examiner.*

MARY O'BRIEN, *Assistant Examiner.*